(12) United States Patent
Anderson

(10) Patent No.: US 11,628,871 B2
(45) Date of Patent: Apr. 18, 2023

(54) MOBILE APPARATUS FOR USE AT A CONSTRUCTION SITE AND METHOD OF USING THE MOBILE APPARATUS

(71) Applicant: Mary Jane Anderson, Mettawa, IL (US)

(72) Inventor: Mary Jane Anderson, Mettawa, IL (US)

( * ) Notice: Subject to any disclaimer, the term of this patent is extended or adjusted under 35 U.S.C. 154(b) by 615 days.

(21) Appl. No.: 16/686,488

(22) Filed: Nov. 18, 2019

(65) Prior Publication Data

US 2021/0146982 A1   May 20, 2021

(51) Int. Cl.
  *B62B 3/10*   (2006.01)
  *B62B 3/12*   (2006.01)
  *E04G 21/16*  (2006.01)
  *B62B 5/00*   (2006.01)
  *B62B 3/00*   (2006.01)

(52) U.S. Cl.
  CPC ............... *B62B 3/10* (2013.01); *B62B 3/001* (2013.01); *B62B 3/12* (2013.01); *B62B 5/0026* (2013.01); *E04G 21/16* (2013.01); *B62B 2202/62* (2013.01); *B62B 2301/044* (2013.01)

(58) Field of Classification Search
  CPC ........... B62B 3/10; B62B 3/001; B62B 3/102; B62B 3/104; B62B 3/106; B62B 3/108; B62B 3/12; B62B 2202/62; B62B 2301/044; B62B 5/0026; E04G 21/16
  See application file for complete search history.

(56) References Cited

U.S. PATENT DOCUMENTS

| | | | |
|---|---|---|---|
| 6,076,621 A * | 6/2000 | Horn | B62D 51/00 180/320 |
| 6,419,244 B2 * | 7/2002 | Meabon | B62B 1/002 280/654 |
| 8,985,619 B2 * | 3/2015 | Celli | B62B 5/085 280/653 |
| 9,908,570 B1 * | 3/2018 | Mayers | B62D 51/04 |
| 2020/0148087 A1 * | 5/2020 | Leatherman | B62B 5/0083 |

* cited by examiner

*Primary Examiner* — John D Walters
(74) *Attorney, Agent, or Firm* — Wood, Phillips, Katz, Clark & Mortimer

(57) ABSTRACT

A method of facilitating production of a structure at a construction site, the method including the steps of: a) obtaining a mobile apparatus having: a frame; first and second wheels and a steerable third wheel spaced in a fore and aft direction from the first and second wheels and laterally between the first and second wheels; and a platform on the frame defining a first upwardly facing surface that is spaced at least 20" above the subjacent surface; b) placing at least one building component in a transporting position on the first upwardly facing surface; c) advancing the mobile apparatus from the first location to a second location at or adjacent the construction site; and d) separating the at least one building component from the transporting position at the second location.

28 Claims, 11 Drawing Sheets

MOBILE APPARATUS FOR USE AT A CONSTRUCTION SITE AND METHOD OF USING THE MOBILE APPARATUS

BACKGROUND OF THE INVENTION

Field of the Invention

This invention relates to the construction industry and, more particularly, to an apparatus that can be used to transport objects, such as construction materials, to, from, and around a construction site. The invention is also directed to a method of using the apparatus.

Background Art

Most residential and commercial buildings, and many surrounding structures, incorporate bricks, concrete blocks, cut or natural stone, etc. (hereinafter collectively referred to as "building block components"). These building block components are typically progressively built up to form foundations, wall structures, floors, etc.

Commonly, these and other similar types of construction components are delivered to staging locations at construction sites in bulk. Bricks and concrete blocks are commonly bundled and held together using metal or plastic straps. Construction components are also staged and transported on pallets. From the staging locations, workers pick up the individual building block components and deliver them to potentially multiple spaced locations where bricklayers and other skilled tradespersons will incorporate them into building structures. Given the weight of the building block components, they are often lifted and maneuvered one by one and generally delivered in only relatively small quantities to different locations around a construction site.

Once the building block components are delivered to the location at which they will be incorporated into a structure, they will generally again be staged, with supplies thereof replenished as they are depleted as the construction proceeds. At the installation location, there are commonly provided ladders, scaffolds, and other elevating structures that allow the workers to integrate the building block components at different heights.

Given the speed at which bricklayers may incorporate the building block components into a structure, a significant number of workers may be required to effect delivery to multiple persons so that their work routine is not interrupted and the efficiency of their efforts is maximized. This extra help may be necessitated through the entire process to incorporate all of the building block components.

Given the significant hourly rates of those construction workers tasked with material handling and delivery on site, the conveyance of the building block components from the staging locations to the incorporation sites may represent a substantial investment that reduces overall project margins.

Further, the repetitive traveling of the workers from the staging areas to the locations where the building block components are installed contributes to worker fatigue, which ultimately compromises performance and efficiency.

Conditions around construction sites typically introduce unique challenges that may increase user fatigue and introduce a heightened risk of injuries. Maneuvering around a construction site often requires that the material transporters walk over uneven surfaces and over and around foreign objects that may be placed on the maneuvering surfaces and periodically moved. Uneven surfaces and foreign objects may dictate that longer paths be taken between the loading and drop-off locations. Regardless of the care that is exercised, workers are prone to tripping on irregular surfaces and objects, which problem is exaggerated when workers attempt to reduce trips by carrying many components that are collectively very heavy. This in turn adds further to worker fatigue.

Accordingly, many different types of apparatus have been developed over the years to facilitate transportation of building materials on-site and to reduce as much as possible user fatigue and risk of injury. This challenge has resulted in many different styles of apparatus.

It is known to use powered equipment for material transportation on sites. However, traditional powered material haulers are expensive to purchase and operate, may require skilled handlers, and pose a risk to others around a construction site that may have large crews that travel in intersecting paths. As a result, a large percentage of materials are transported to and around construction sites using manually-propelled designs.

A most basic manual material transportation device is a wheelbarrow design. While wheelbarrows are used for many purposes around construction sites, they have significant limitations when it comes to transporting materials, such as building block components, in bulk.

First of all, the "bucket" shape of the wheelbarrow complicates the placement of components therein and removal of components therefrom. Lifting of components into and from the wheelbarrow receptacle places significant strain on the bodies of the workers. Introduction and removal of components involves leaning over the receptacle at an awkward angle which stresses particularly the back region. Further, workers may pinch their limbs as they maneuver components into and from the confines of the wheelbarrow receptacle.

Further, wheelbarrows generally have relatively small diameter wheels. As a result, wheelbarrow travel may be interrupted or inhibited by uneven surfaces, foreign objects, etc., typically present around a construction site.

The above problems are aggravated by the fact that wheelbarrows require balancing forces to be applied so that they do not tip. These forces may be significant with heavy loads. Reclaiming of a tipped load of material involves further lifting of components and maneuvering of the same into and out of the wheelbarrow receptacle. Significant time may be lost on construction sites as such tipping may be a relatively common event.

Two-wheeled dolly designs are also commonly used to transport building block components and other construction materials. These dollies suffer the limitation that they are most commonly made with relatively small diameter wheels to allow a lifting edge to be wedged under a pallet or stack of materials that is on the ground or in close proximity thereto. Small diameter wheels may sink into soft soil and are generally difficult to advance over uneven surfaces, particularly with a substantial load thereupon. At the same time, these dollies require a significant amount of force to be moved while maintaining balance. Tipping is a common problem, which again introduces the need to reclaim escaped articles or loads.

"Wagon"-type apparatus having a rectangular plan shape with wheels at each of four corners is another design that is used on construction sites. To facilitate loading, these apparatus are also commonly made with small wheels so that a surface upon which the materials are placed is relatively low in relationship to the ground—typically under 20" above a subjacent surface supporting the apparatus. While the additional wheels afford greater stability than wheelbarrow and dolly constructions, the additional wheels of relatively small diameter introduce other problems.

On other than a flat and finished surface, it is difficult at any construction site to find any extended area that will accommodate all four wheels and allow simultaneous rolling thereagainst without obstruction. Again, the soft soil challenge of dollies is contended with. Further, turning radii are generally large, which limits utility at many sites. Given the difficulty in finding usable paths from an original staging location to the location at which the materials will be installed, it is common to use this type of cart to simply move materials to a second staging location that is closer to the site at which they will be used, but one that still requires manual lifting of the materials from the apparatus and conveyance over potentially a significant further distance.

The limitations of the above types of apparatus may result in their being used to transport relatively light and small loads with each "trip" to the installation site.

In spite of the existence of the above problems in the building industry for many decades, no practical solution is known to the Applicant to adequately address a number of these problems. Heretofore, focus has been on maximizing productivity of more expensive bricklaying personnel by keeping on hand potentially a large number of individuals who are being paid simply to shift component location using equipment that is often difficult to use, exposes a user to risk, and causes early fatigue.

SUMMARY OF THE INVENTION

In one form, the invention is directed to a method of facilitating production of a structure at a construction site. The method includes the steps of: a) obtaining a mobile apparatus; b) placing the mobile apparatus in an operative position on a subjacent surface; c) placing at least one building component in a transporting position on a first upwardly facing surface with the mobile apparatus at a first location; d) with the at least one building component in the transporting position, advancing the mobile apparatus from the first location to a second location at or adjacent the construction site by causing the first and second wheels to be rolled against the subjacent surface; and e) with the mobile apparatus at the second location, separating the at least one building component from the transporting position so that the at least one building component can be used, or integrated into a structure, at the construction site. The mobile apparatus has a front, a rear, a top, and laterally spaced sides. The mobile apparatus has a frame and a plurality of wheels on the frame that support the mobile apparatus in the operative position on a subjacent surface. The plurality of wheels includes laterally spaced first and second wheels and a third wheel spaced in a fore and aft direction from the first and second wheels and residing laterally between the first and second wheels. The third wheel is selectively repositionable relative to the frame to allow controlled directional movement of the mobile apparatus as the first, second, and third wheel are rolled against a subjacent surface with the mobile apparatus in the operative position. A platform on the frame defines a first upwardly facing surface that is spaced at least 20" above the subjacent surface with the mobile apparatus in the operative position.

In one form, the third wheel is repositionable relative to the frame by turning around a vertically extending axis.

In one form, the method further includes the step of steering the mobile apparatus by repositioning the third wheel relative to the frame as the mobile apparatus is advanced from the first location to the second location.

In one form, the mobile apparatus further includes an elongate arm that is movable guidingly relative to the frame. The step of repositioning the third wheel includes engaging the elongate arm and moving the elongate arm relative to the frame, as an incident of which the third wheel is repositioned relative to the frame.

In one form, the mobile apparatus has a support that depends from a part of the frame and to which the third wheel is connected for guided movement around a horizontally extending axis. The support is movable with the third wheel relative to the frame and connected to the elongate arm to follow movement of the elongate arm.

In one form, the elongate arm one of: a) projects forwardly from the frame; and b) projects rearwardly from the frame.

In one form, the step of advancing the mobile apparatus involves engaging the elongate arm and exerting a force on the elongate arm to thereby cause the first and second wheels to roll against a subjacent surface.

In one form, the mobile apparatus further includes a graspable handle fixed to the frame. The step of advancing the mobile apparatus involves grasping the graspable handle and exerting a force on the graspable handle to thereby cause the first and second wheels to roll against the subjacent surface.

In one form, the frame has a width dimension between laterally spaced sides. The graspable handle has an elongate body that extends laterally over a majority of the width dimension of the frame.

In one form, the elongate arm has an elongate body with a length that extends substantially horizontally. The step of engaging the elongate arm includes grasping the elongate body.

In one form, the mobile apparatus has a drive for at least one of the plurality of wheels. The step of advancing the mobile apparatus includes operating the drive to turn the at least one wheel.

In one form, the mobile apparatus further includes a shelf on the frame defining a second upwardly facing surface spaced vertically from the first upwardly facing surface. The method further includes the steps of placing one or more objects usable at the construction site on the second upwardly facing surface.

In one form, the method further includes the step of placing first and second blocks operatively with respect to one of the plurality of wheels. The first and second operatively placed blocks limit rolling of the one of the plurality of wheels in opposite directions thereby to control unwanted movement of the mobile apparatus.

In one form, the method further includes the step of standing on the first upwardly facing surface while producing at least a part of the structure at the construction site.

In one form, the at least one building component is a plurality of building block components. The step of integrating the at least one building component consists of serially placing the building block components to produce the structure.

In one form, multiple of the plurality of building block components are serially placed while standing on the first upwardly facing surface.

In one form, the method further includes the steps of operatively placing the first and second blocks before placing the at least one building component in the transporting position.

In one form, the method further includes the steps of operatively placing the first and second blocks, and maintaining the first and second blocks operatively placed, at the construction site while the at least one building component is separated from the transporting component.

In one form, the first upwardly facing surface has a length between the front and rear of the mobile apparatus. The step of placing the at least one building component in the transporting position involves placing a plurality of building block components on the first upwardly facing surface only on a first area extending from a first fore-and-aft location towards one of the front and rear of the mobile apparatus so as to define a standing area for a user extending from the first fore-and-aft location towards the other of the front and rear. The third wheel is closer to the other of the front and rear than the one of the front and rear.

In one form, the first area is greater than the standing area.

In one form, the invention is directed to the mobile apparatus described above.

In one form, the mobile apparatus is supported entirely by the first, second, and third wheels.

In one form, with the mobile apparatus in the operative position on a subjacent surface, the first upwardly facing surface is spaced at least 30" above the subjacent surface.

In one form, with the mobile in the operative position on a subjacent surface, the first upwardly facing surface is spaced at least 40" above the subjacent surface.

In one form, the first and second wheels each has a radius of at least 12".

In one form, the first and second wheels each has a ground engaging width of at least 4".

In one form, the third wheel has a radius of at least 12" and a ground engaging width of at least 4".

In one form, the third wheel is repositionable by turning relative to the frame around a vertically extending axis.

In one form, as viewed from a side perspective, peripheral ground engaging surfaces on the first and second wheels are either: a) in fore-and-aft overlapping relationship with a peripheral ground engaging surface on the third wheel; or b) spaced in a fore-and-aft direction a distance of no more than 6" from the peripheral ground engaging surface of the third wheel.

In one form, the first upwardly facing surface is substantially flat and resides in a plane that is substantially horizontal with the mobile apparatus in the operative position on a horizontal subjacent surface.

In one form, each of the first and second wheels has a pneumatic tire.

In one form, there is a blocking wall projecting upwardly from the first upwardly facing surface to confine objects placed on the first upwardly facing surface.

In one form, the mobile apparatus further includes an elongate arm that is movable guidingly relative to the frame to thereby reposition the third wheel.

In one form, the elongate arm projects one of: a) forwardly; and b) rearwardly from the frame.

In one form, the elongate arm has an elongate body that extends substantially horizontally. The elongate arm is graspable by a user to allow repositioning of the third wheel and exert a force thereon to cause the first and second wheels to roll against a subjacent surface.

In one form, the mobile apparatus has a width. The mobile apparatus further includes another graspable handle, spaced from the elongate arm and fixed on the frame. The another graspable handle has a body with an elongate shape with a lateral length extending over a majority of the width of the mobile apparatus.

In one form, the mobile apparatus further includes a powered drive for turning at least one of the plurality of wheels.

In one form, the mobile apparatus further includes a shelf on the frame defining a second upwardly facing surface spaced vertically from the first upwardly facing surface.

In one form, the frame is made from attached angle iron pieces that cooperatively bound a cuboid shape with a fore-and-aft length dimension greater than a lateral width dimension.

In one form, the first and second wheels extend laterally beyond the first upwardly facing surface.

DETAILED DESCRIPTION OF THE PREFERRED EMBODIMENT

Figure 1:
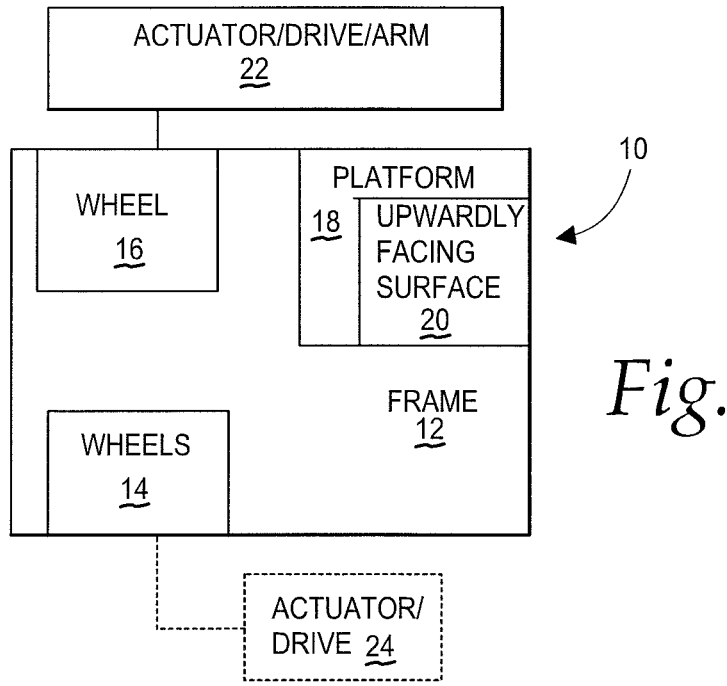
FIG. 1 is a schematic representation of a mobile apparatus used to facilitate production of a structure at a construction site, according to the invention.

In FIG. 1, a mobile apparatus, according to the present invention, is shown schematically at 10. The mobile apparatus 10 consists of a frame 12 with a plurality of wheels on the frame 12 that support the apparatus 10 in an operative position on a subjacent surface.

More specifically, there are at least first and second wheels 14 spaced laterally from each other, and a third wheel 16 selectively repositionable relative to the frame 12 to allow controlled directional movement of the mobile apparatus 10 as the wheels 14, 16 are rolled against the subjacent surface.

The apparatus 10 further includes a platform 18 on the frame 12 and defining an upwardly facing surface 20 that is spaced at least 20" above the subjacent surface supporting the apparatus 10 in its operative position.

The apparatus 10 further has an actuator 22 that is operable to reposition the wheel 16 relative to the frame to allow controlled directional movement of the apparatus 10 as the wheels 14, 16 roll against the subjacent surface.

An optional form of actuator/drive 24 may be used to turn one or both of the wheels 14 to advance the apparatus 10 along a subjacent surface.

The schematic depiction of the apparatus 10 is intended to identify the basic, preferred components making up the apparatus 10. The schematic depiction is intended to encompass the specific form of components, in the embodiments as described hereinbelow, and variations of each of those components and their interactions, as would be obvious to one skilled in the art with the present teachings in hand.

For example, the actuator 22 may be in the form of a powered unit that drives the wheel 16 or may be in the form of an arm that can be engaged and manipulated by a user to effect turning of the wheel 16 and/or advancing of the apparatus 10 by applying an appropriate force thereupon.

Similarly, the actuator 24 may be a powered unit that drives one or both of the wheels 14 or may be a structure that allows manual input of a propelling force upon the apparatus 10.

In the FIG. 1 depiction, it is preferred that the wheels 16 be spaced in the fore-and-aft direction from the laterally spaced wheels 14 and reside laterally between the wheels 14 and, more preferably, centered therebetween. More than one wheel 16 might be utilized in this relationship for additional support while maintaining a basic tricycle-type arrangement.

It should be noted that the designations "front" and "rear" are arbitrary, since front and rear change depending upon whether the apparatus 10 is being pushed or pulled. For purposes of simplicity, the apparatus 10 will be described used in a pulling mode wherein the wheel 16 is considered to be at the front of the apparatus 10.

Figure 2:
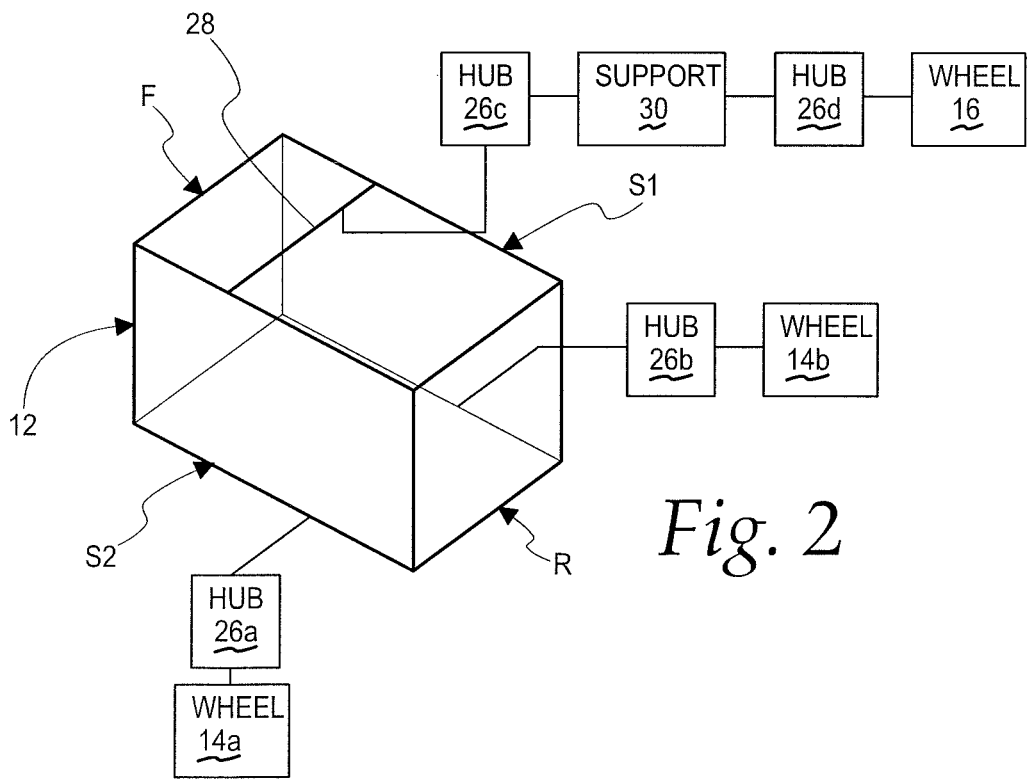
FIG. 2 is a schematic representation showing other features of the apparatus in FIG. 1.

In FIG. 2, a further schematic representation of components making up the apparatus 10 is shown. As depicted, several components nominally circumscribe a cuboid shape with laterally spaced sides S1, S2, a front F, and a rear R. While not required, the frame 12 has a longer fore-and-aft dimension than width dimension.

In one preferred form, four separate hubs 26a, 26b, 26c, 26d are used, each to support and guide movement of a component around an axis relative to the frame 12.

Hubs 26a, 26b are attached to the frame 12 closer to the rear than the front thereof. The hubs 26a, 26b support wheels 14a, 14b, respectively, for rotation of each around a laterally extending axis. The hubs may be mounted independently upon the frame 12 or connected through an axle as described hereinbelow.

The hub 26c is supported on a frame part 28 to guide a support 30 in movement relative to the frame 12 around a vertically extending axis. The support 30 in turn has the hub 26d mounted thereon so that it guides turning movement of the wheel 16 relative to the support 30 around a horizontally extending axis.

It should be understood that the schematic showing in FIG. 1 encompasses this particular design and variations thereof which might not include the specific details described with respect to FIG. 2. FIG. 2 represents simply one preferred form which may afford certain advantages, such as allowing each of the hubs 26 to have the same construction, which of course is not a requirement. Nor is it required that the support 30 move around a single axis to allow repositioning of the associated wheel 16.

Figure 3:
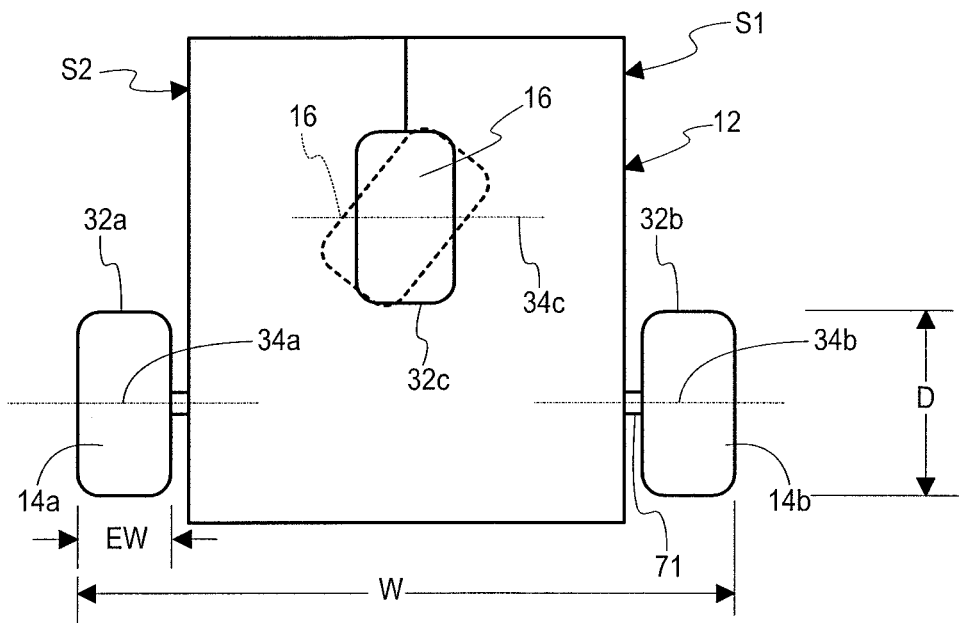
FIG. 3 is a schematic representation showing further features of the apparatus shown in FIGS. 1 and 2.

FIG. 3 shows a further schematic representation of additional details of the apparatus 10 from a plan perspective. In FIG. 3, each of the wheels 14a, 14b, 16 is shown with the same dimensions, although this is not a requirement.

Exemplary wheel 14b is shown with a diameter D that, in one preferred form, is on the order of 13". While the diameter D could be considerably less than or greater than 26", it is preferred to be at least 24" to navigate typical uneven and soft terrain at a construction site.

The exemplary wheel 14a in FIG. 3 has a ground engaging peripheral surface 32a with a ground engaging width EW of at least 4". The dimension EW could be less than or greater than 4".

The arrangement of wheels 14a, 14b, 16 is such that the turning axes 34a, 34b, respectively for the wheels 14a, 14b, are horizontal and coincident.

The wheel 16 turns around an axis 34c, which with the pivot arrangement described above, is repositionable, as shown with the wheel 16 turned in one direction in dotted lines in FIG. 3. With the wheel 16 in a straight forward traveling position, the axis 34c is horizontal and parallel to the axes 34a, 34b.

The wheel mounting location is preferably such that the ground engaging peripheral surface 32c of the wheel 16 in the solid line position of FIG. 3 is not spaced from the peripheral surfaces 32a, 32b a distance greater than six inches in a fore-and-aft direction. The surfaces 32c and 32a, 32b may overlap in a fore-and-aft direction for a more compact and solid supporting base for the apparatus 10.

Figure 4:
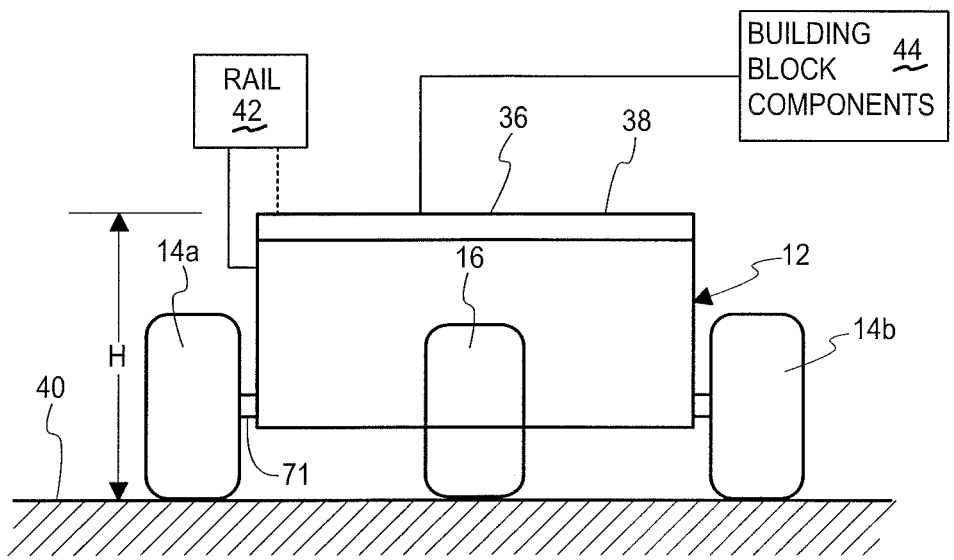
FIG. 4 is a schematic representation showing still further features of the apparatus shown in FIGS. 1-3.
Figure 5:
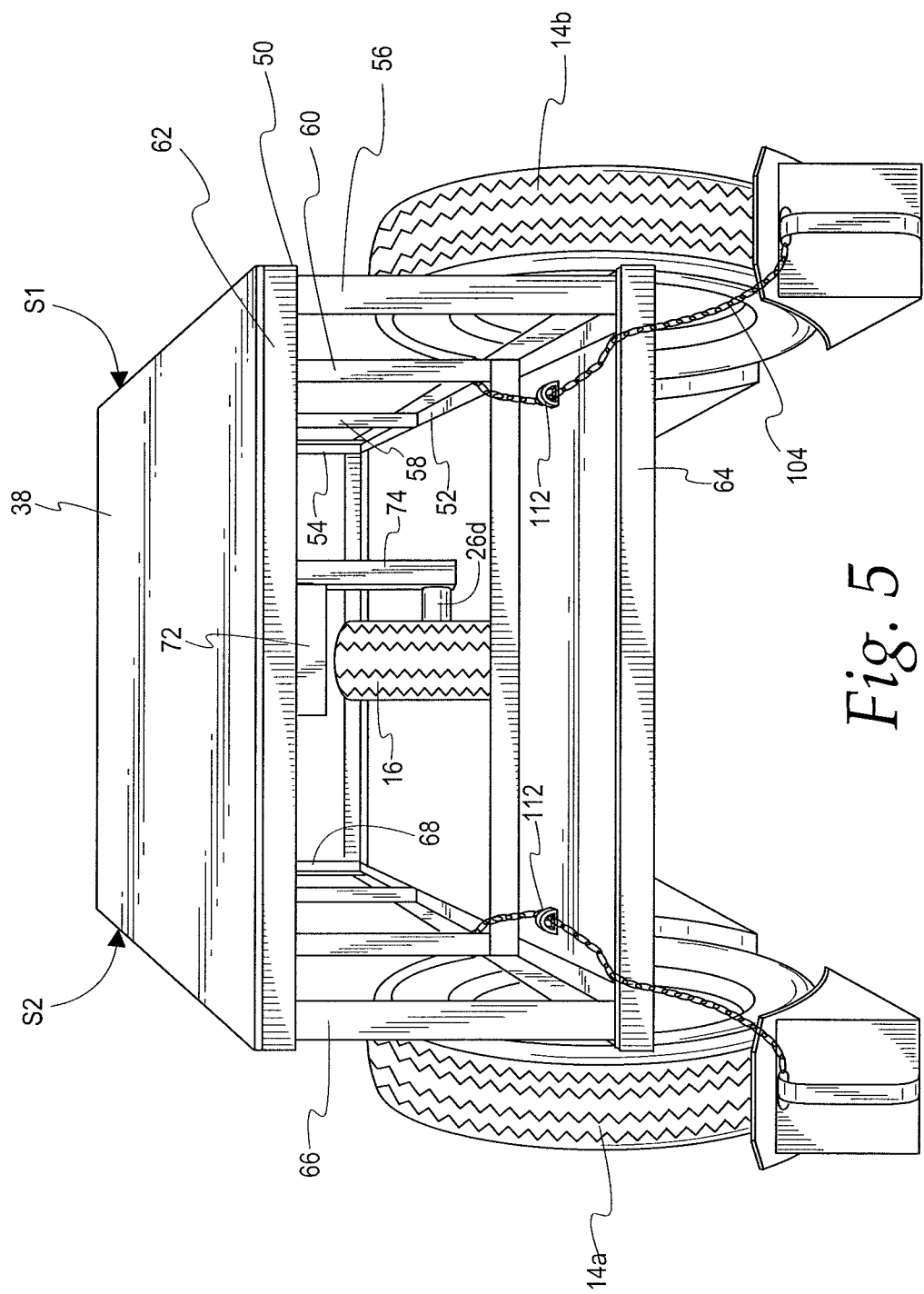
FIG. 5 is a rear perspective view of an exemplary form of the inventive mobile apparatus shown in FIGS. 1-4 and with wheel blocks in place.
Figure 6:
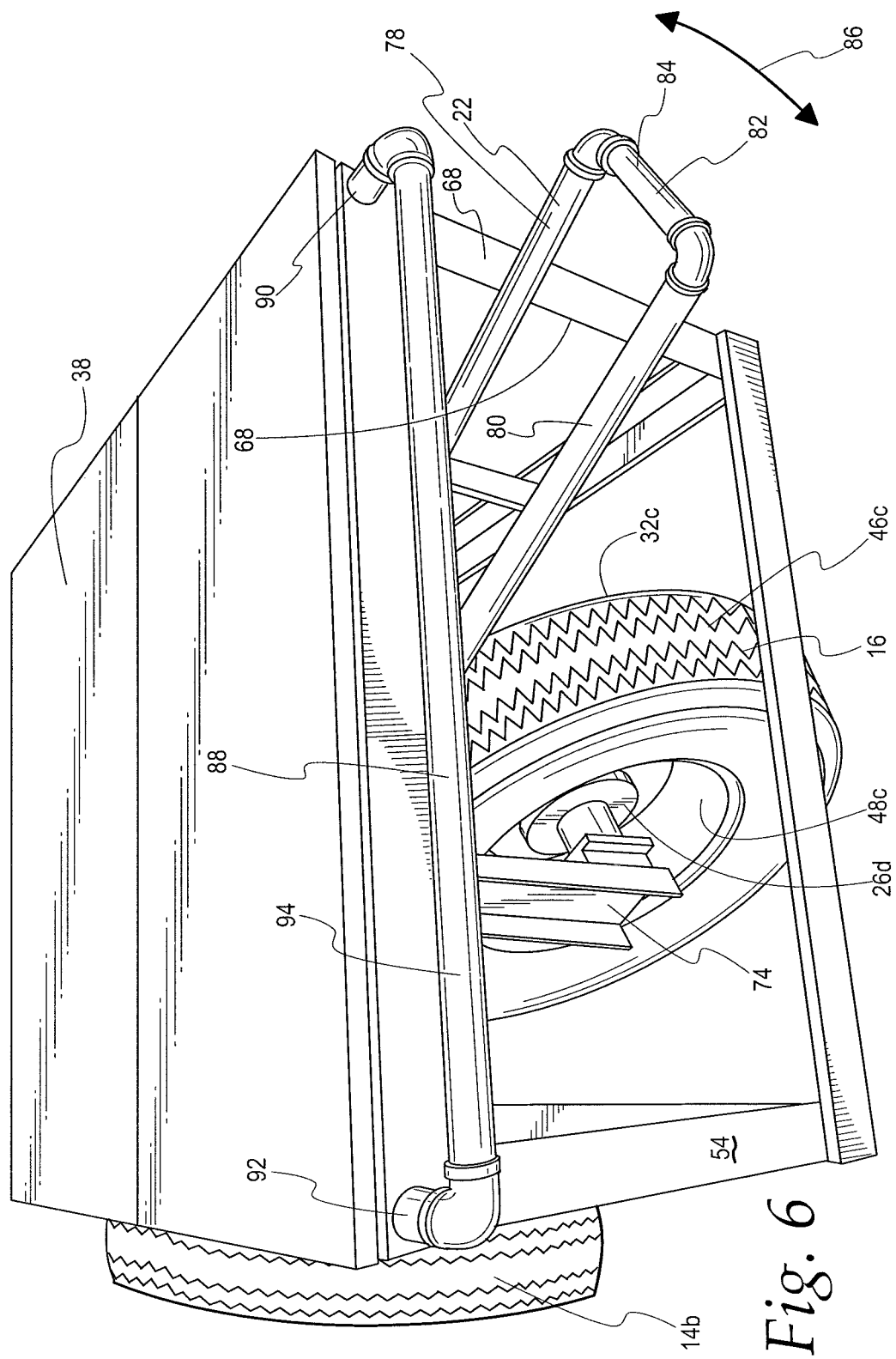
FIG. 6 is a front perspective view of the apparatus in FIG. 5 and with a steerable front wheel moved from the FIG. 5 position.
Figure 7:
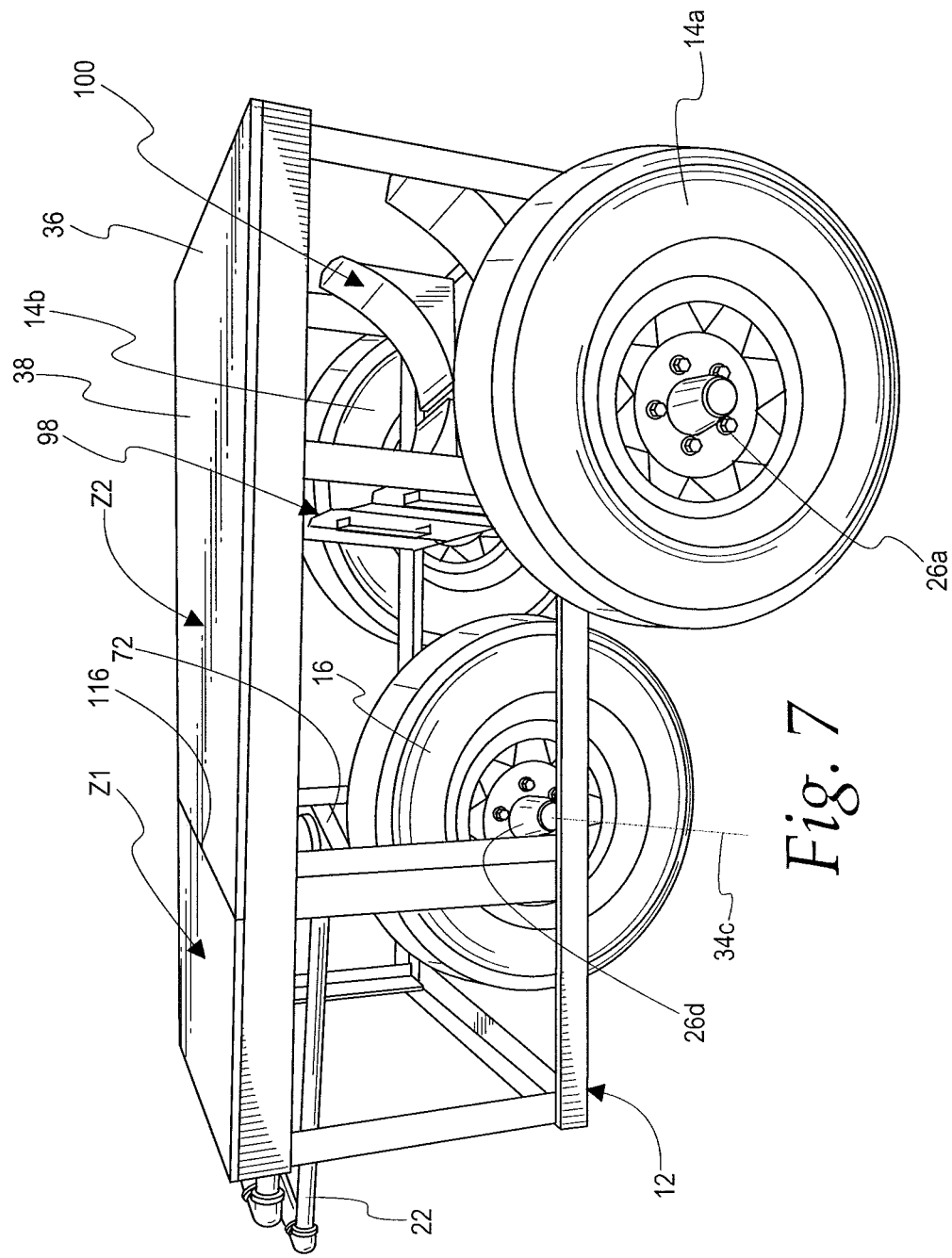
FIG. 7 is a side perspective view of the apparatus in FIGS. 5 and 6 and with the wheel blocks in a stored position thereon.
Figure 8:
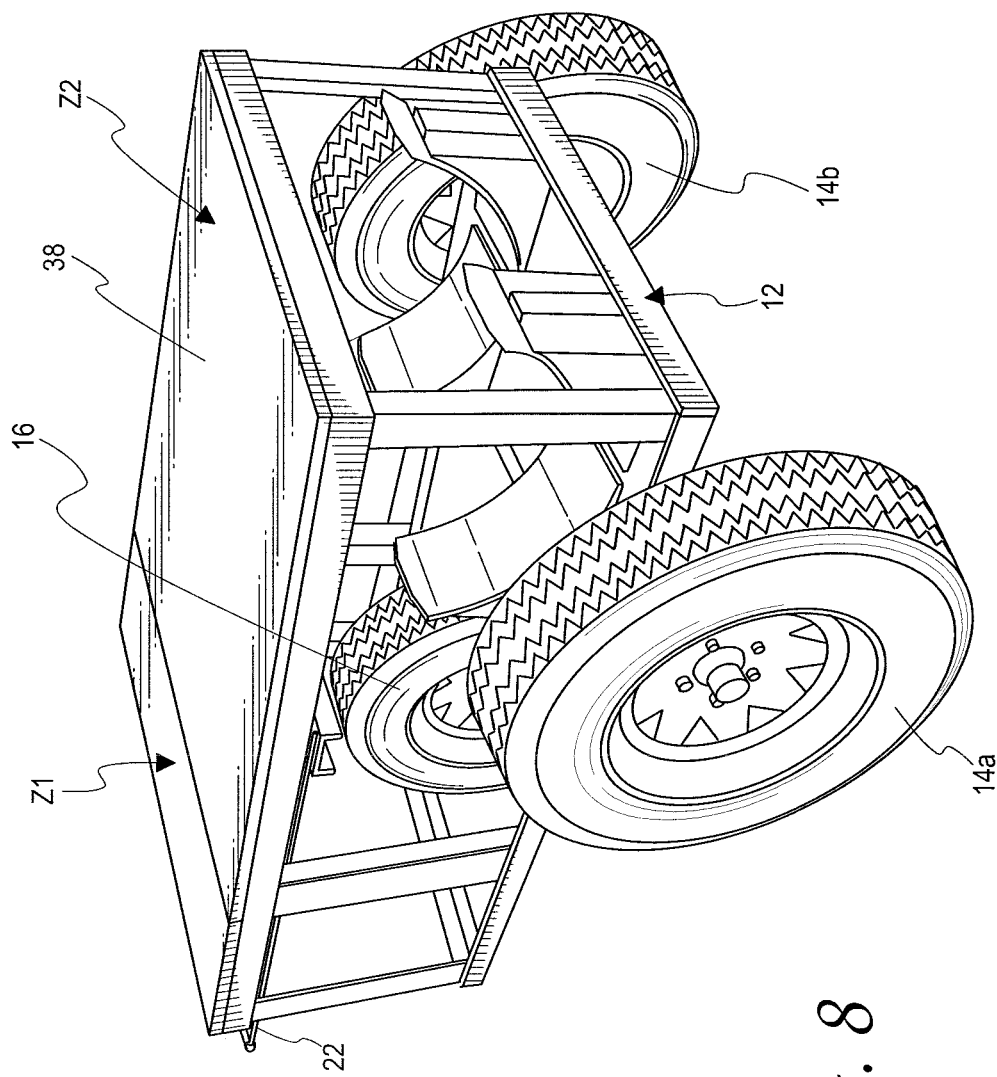
FIG. 8 is a rear and side perspective view of the apparatus in the FIG. 7 state.
Figure 9:
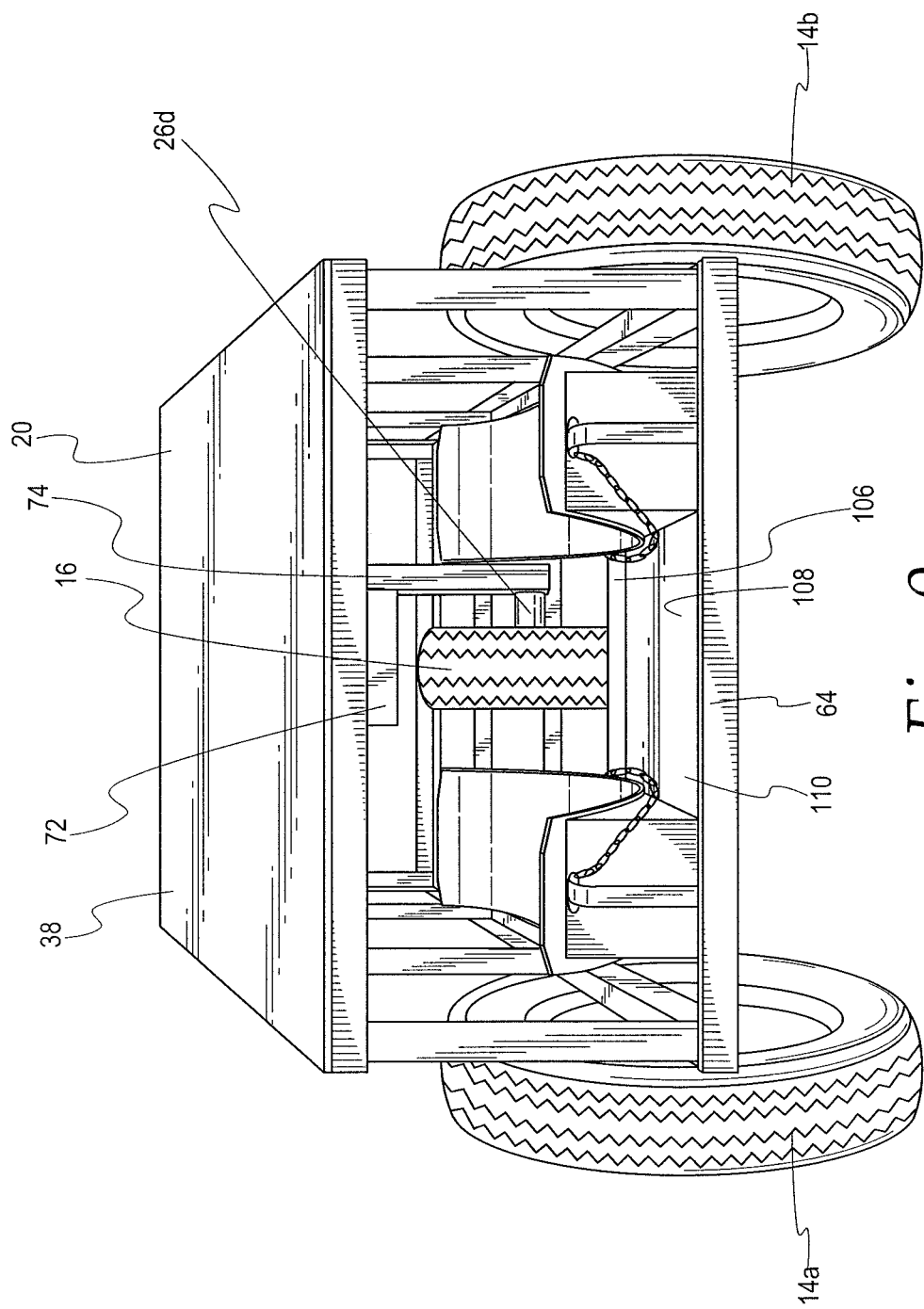
FIG. 9 is a rear perspective view of the apparatus in the state in FIGS. 7 and 8.
Figure 10:
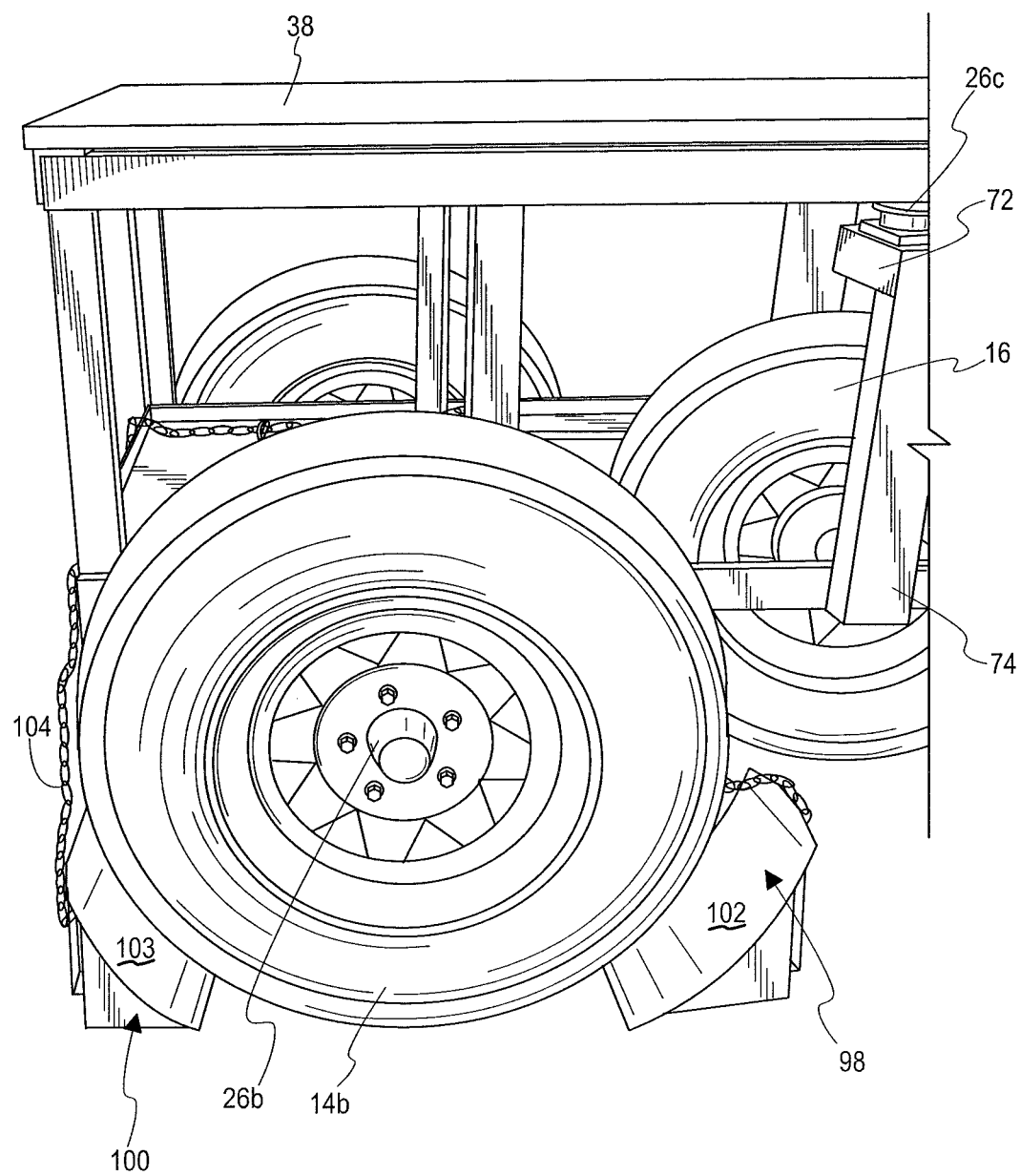
FIG. 10 is a fragmentary, side perspective view of the apparatus in FIGS. 5-9 with the wheel blocks operatively positioned.
Figure 11:
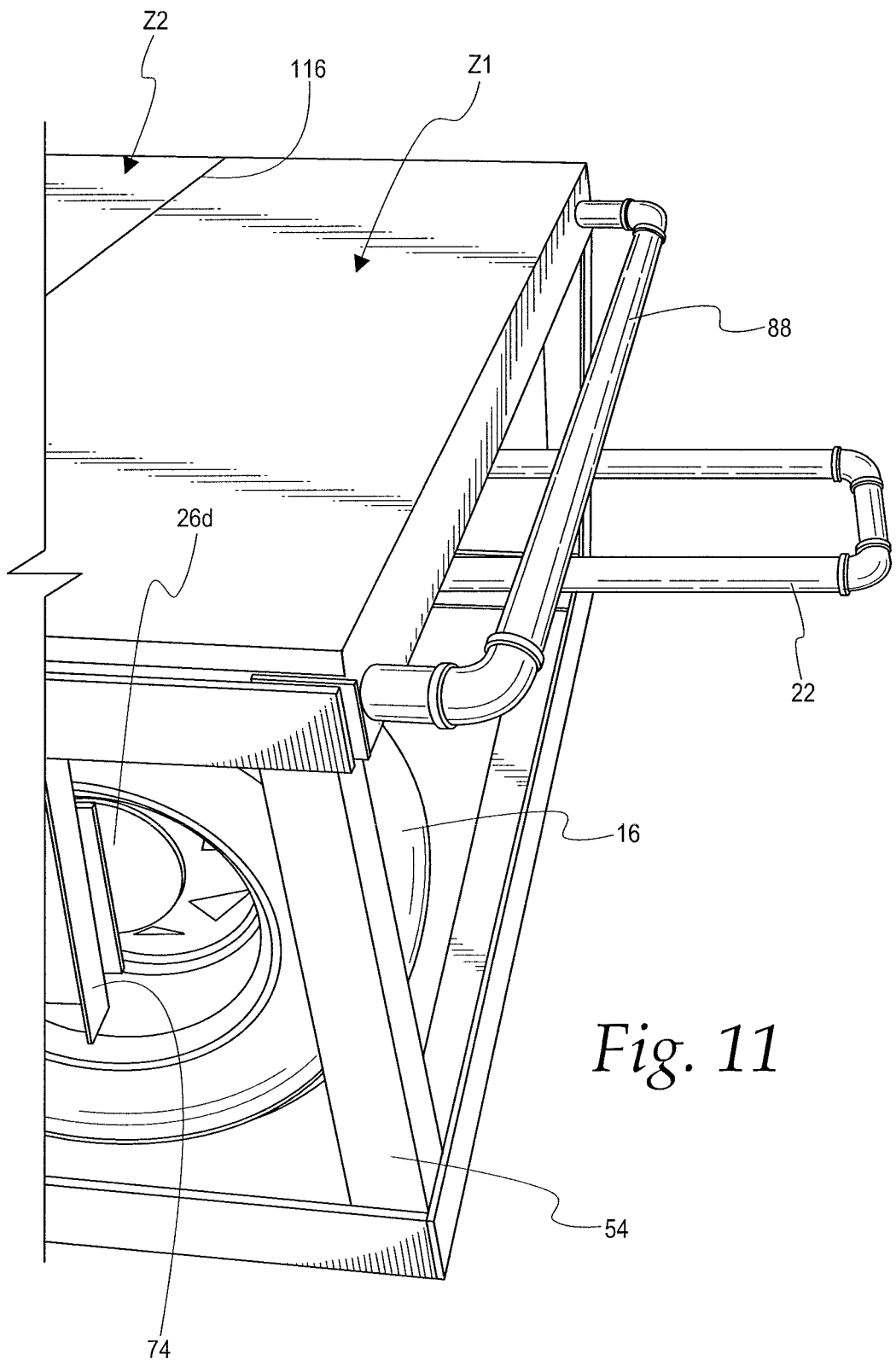
FIG. 11 is a fragmentary, front perspective view of the apparatus in FIGS. 5-10.
Figure 12:
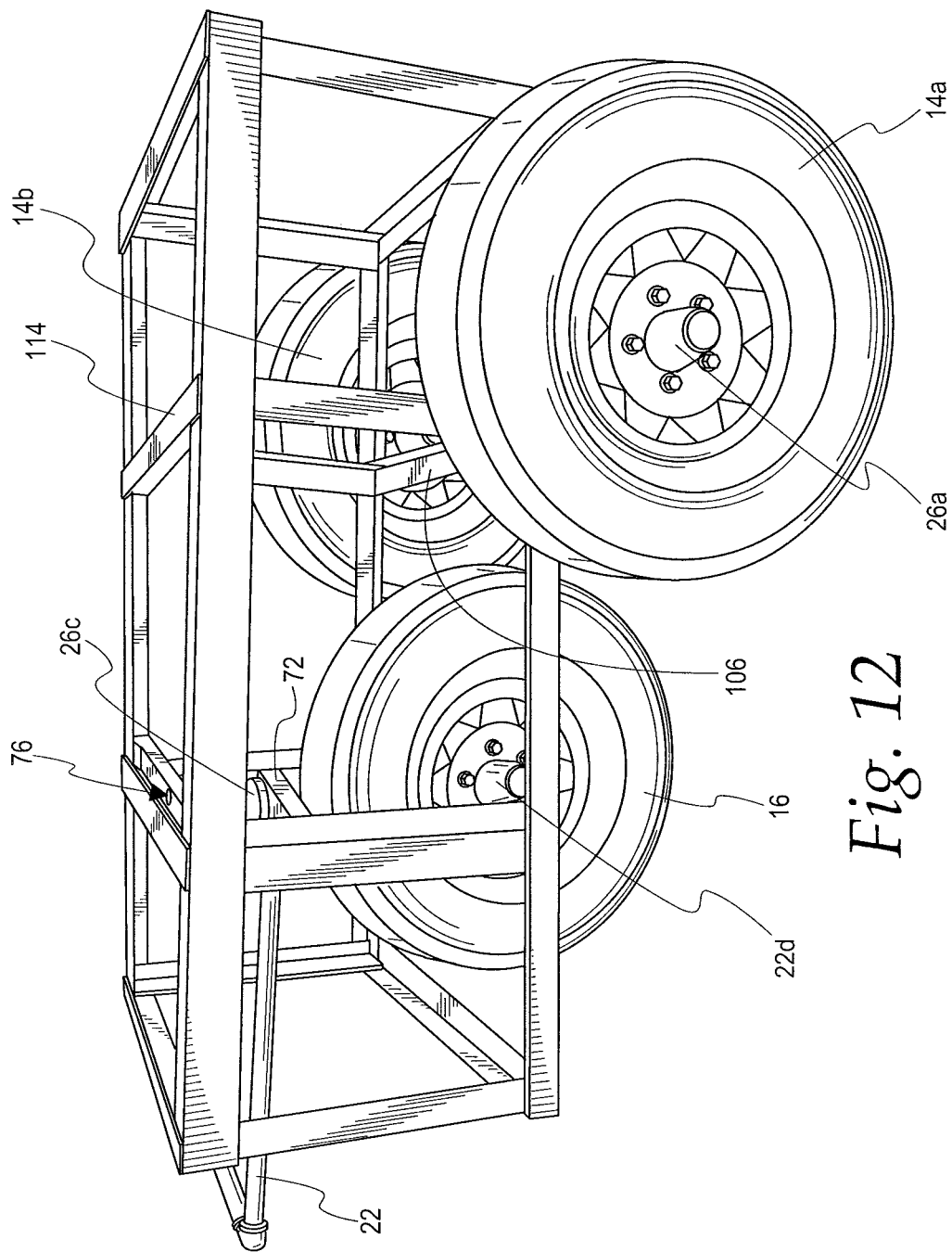
FIG. 12 is a side perspective view of the apparatus in FIGS. 5-11 with a platform for supporting objects removed.

As shown in FIG. 4, the frame 12 and wheels 14a, 14b, 16 are configured so that a flat, upwardly facing surface 36 on a platform 38 supported on the frame 12 resides at a height H above a subjacent supporting surface 40 that is at least 20". The height H is controlled by the diameters of the wheels 14a, 14b, 16 as well as the vertical location at which the hubs 26a, 26b are mounted upon the frame 12.

As depicted schematically in FIG. 4, an optional rail 42 may be provided on the frame 12 and/or the platform 38 to provide an upwardly projecting blocking wall above the surface 36 to confine objects on the surface 36. The rail 42 may extend partially or fully around the perimeter of the platform 38 to strategically control sliding movement of objects and dictate the surface area dimension that is available for placement of objects.

The apparatus 10 is ideally suited to support and allow transportation of building block components 44, as shown schematically in FIG. 4. The building block components 44 can be stacked upon the surface 36 and confined within the bounds of the rail 42, if one is provided. However, the apparatus is usable to transport any building materials, equipment, supplies, etc. that can be supported upon the platform 38, for simplicity in the detailed description and claims herein, all considered to be "building components".

One exemplary form of the mobile apparatus 10 will now be described with respect to FIGS. 5-13. This specific form is exemplary in nature only and is representative of the form within the generic showing of FIGS. 1-4 which broadly depicts the inventive concepts.

As noted above, while the wheels 14a, 14b, 16 do not have to have the same construction, in the embodiment shown, the wheels 14a, 14b, 16 are all the same. Exemplary wheel 16, as seen most clearly in FIG. 6, has a pneumatic tire 46c, with the peripheral surface 32c thereon treaded for traction. The tire 46c is mounted on a rim 48c to which the hub 22d is mounted.

The frame 12 has a welded construction made principally, or entirely, from lengths of metal parts—in this embodiment each from angle iron stock. "Angle iron", as used herein, encompasses L-shaped, C-channel, and box metal stock. Of course, this is not a requirement.

The sides S1, S2 on the frame 12 have the same construction, with the exemplary side S1 having parallel upper and lower lengthwise pieces 50, 52 joined by front and rear upright pieces 54, 56 and joined therebetween by spaced intermediate upright pieces 58, 60.

The rear R of the frame is made up of upper and lower laterally extending connecting pieces 62, 64 joined to the rear upright piece 56 and to a corresponding rear upright piece 66 at the side S2. Accordingly, the upright pieces 54, 56, 66 and an upright piece 68 at the front and at the side S2 of the frame define shared corner pieces between the sides S1, S2, front F, and rear R to define the cuboid shape initially as described with respect to FIG. 2, with the sides S1, S2 and front and rear being mirror images of each other. The hubs 26a, 26b are connected through an axle 71 (FIG. 3) spanning the sides S1, S2 and fixed thereto adjacent the frame pieces 52, 70, with the latter frame piece 70 being a mirror image of the frame piece 52.

The support 30 is L-shaped with a horizontal leg 72 and a vertical leg 74. The horizontal leg 72 is connected to a beam 76, spanning the sides S1, S2 of the frame 12, through the hub 26c. Accordingly, the support 30 depends from the frame beam 76. The hub 26d is mounted to the leg 74 to support the wheel 16 for turning relative thereto around its axis 34c.

The aforementioned arm 22 has a rearwardly opening "U" shape defined by legs 78, 80 joined by a bight portion 82. The free ends of the legs 78, 80 are attached to the horizontal leg 72 on the support 30 so as to straddle a location at which the hub 26c connects to the leg 72.

The bight portion 82 is defined by an elongate body 84 that has a length extending generally horizontally and is of a width and diameter that can be conveniently grasped by a user's hand. With the body 84 grasped, a user can conveniently swing the handle 22 from side to side, as indicated by the double-headed arrow 86, to thereby reposition the wheel to allow steering of the apparatus 10.

The construction of the arm 22 is such that when grasped, a force can also be comfortably applied to either push or pull the apparatus 10 while allowing simultaneous steering to occur.

The range of pivoting may be confined by the corner uprights 54, 68 on the frame 12, which define part of the front of the frame 12, through which the arm 22 projects.

To further facilitate manual advance of the apparatus 10, another handle 88 is provided on the frame 12. The handle 88 is spaced from the arm 22. In this embodiment, the handle 88 has a "U" shape with legs 90, 92 connected to the front of the frame 12. A base of the "U" is in the form of an elongate body 94 that is graspable by a user's hand. In this embodiment, the elongate shape has a length that extends over at least a majority of the overall width W (FIG. 3) of the apparatus, and at least over a majority of the width of the frame 12. With this extended width, several persons can simultaneously grasp the body 94 to exert a force thereupon to advance the apparatus 10 through either a pushing or pulling force application.

Figure 13:
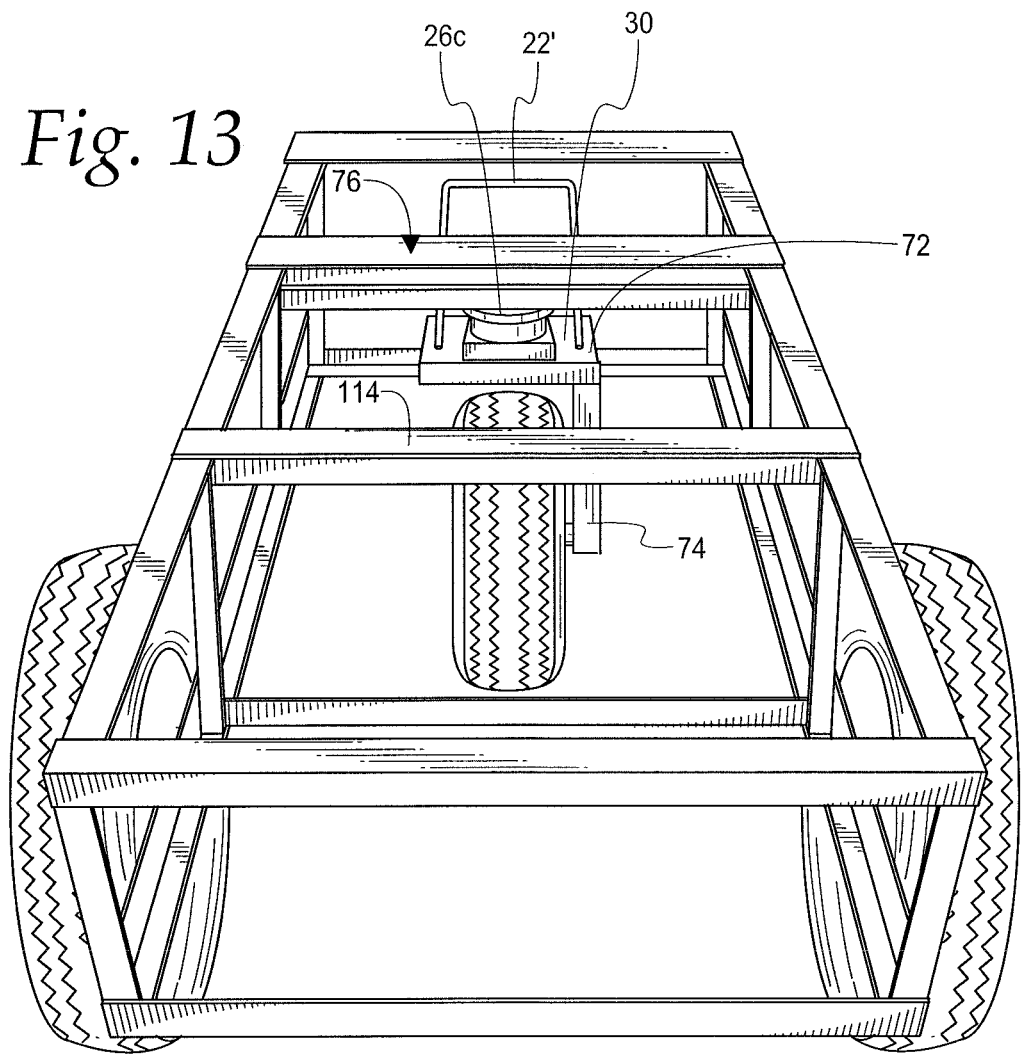
FIG. 13 is a top perspective view of the apparatus in the FIG. 12 state.

In the embodiment shown, the arm 22 and handle 88 are made from threaded pipe components. While this facilitates manufacture, this construction is not required. For example, as shown in FIG. 13, the arm 22' is made from formed, metal reinforcing bar.

A pair of wheel blocks 98, 100 may be provided to prevent unwanted movement of the apparatus 10, as when it is being loaded and unloaded, and when being used as a work platform, as described hereinbelow. The wheel blocks 98, 100 may have any conventional construction. As depicted, the blocks 98, 100 have angled surfaces 102, 103, respectively, that produce a wedge that blocks rolling of the wheel surface against which it is placed.

In this embodiment, the wheel blocks 98, 100 are provided in pairs for each of the wheels 14a, 14b. The wheel blocks 98, 100 are connected to each other by a tether/chain 104 that keeps the wheel blocks 98, 100 paired and accessible for use while also potentially preventing separation between the operatively placed wheel blocks 98, 100, shown at FIG. 10, that would prevent an unwanted amount of turning of the associated wheel 14b, resulting in movement of the entire apparatus 10.

In the depicted embodiment, an additional angle iron crosspiece 106 is fixed on the frame to provide, in conjunction with the frame piece 64, a support for a shelf 108 with an upwardly facing surface 110 beneath the upwardly facing surface 20 on the platform 18. Both pairs of wheel blocks 98, 100 can be placed and stored on the shelf surface 110 when not in use.

In this embodiment, a closed loop 112 is provided at each side of the shelf 108 and is configured to allow the tether/chain 104 to pass therethrough. This allows the wheel blocks 98, 100 to be confined on the frame 12 in the vicinity of their respective wheel 14a, 14b when stored.

As noted above, the use of angle iron pieces for constructing the frame 12 throughout affords the convenience of meshing the angle iron pieces for welding and also provides flat support surfaces for the shelf 108 and the platform 38, as well as the hubs 26, handle 88, etc. C-channel and box metal stock are shown where added rigidity and strength are required, as to define the support 30 and integrate the support 30 into the frame 12, to define the rear axle 71 for the wheels 14a, 14b, etc.

With the above described structure, the platform 38 may be defined by a flat component, such as plywood on the order of ¾". Reinforcement is provided between the front and rear of the frame 12 by the beam 76 and one or more additional crosspieces 114.

While the entire upwardly facing surface 36 on the platform 38 may be squared in perimeter shape, flat and horizontal, other shapes, contours, and orientations are contemplated. A stepped arrangement might be provided or other contours may be incorporated.

For added stability, the wheels 32a, 32b extend laterally beyond the sides of the platform surface 36, as seen clearly in plan in FIG. 3. However, this is not a requirement, as the platform 38 may partially or fully overlap the wheels 32a, 32b from a plan perspective.

While the height H in FIG. 4 is characterized as being at least 20", the height H may extend to 40" or above to provide a high platform to facilitate unloading of the materials thereon to a higher elevation or actual installation of the materials thereon progressively from a position standing on the platform 38. While 20" is generally viewed as a lower desired dimension for the height H, more preferably the dimension H is at least 30", and most preferably on the order of 35".

While the apparatus 10 is shown to be supported entirely by the three wheels 14a, 14b, 16, additional wheels might be incorporated. As noted above, it is preferred that a tricycle arrangement of wheels be provided for better steerability.

With the three wheel arrangement, and the construction and placement of components as described above, the platform 38 can be utilized most efficiently and safely by distinguishing two areal zones Z1, Z2 on the platform surface 36. These zones are divided by an imaginary laterally extending line 116. The area of the zone Z2 is greater than the area of the zone Z1, with the zone Z1 located at the forward region of the platform 38. The line 116 as depicted is above the wheel 16 and forward of the wheel axis 34c.

A visible distinction between the zones Z1, Z2, as by different colors, can be made so that in use a user will be given a clear visible identification of the optimal placement of the materials in zone Z2, which is firmly supported by the tricycle wheel arrangement therebeneath. The user can then safely stand on the platform 38 in the area of zone Z1 without fear that the apparatus will tip or become unstable. The weight of the user presses primarily down on the wheel 16. A very substantial moment arm would be required to pivot the rear end upwardly or to destabilize the apparatus 10 in any appreciable manner with this arrangement.

Thus, a user can safely stand in the zone Z1 while loading objects on the apparatus 10, separating objects therefrom, and additionally while assembling objects, such as building block components in their final locations while standing upon the platform 38. For example, the building block components 44 might be serially built up at a height above the subjacent surface while standing upon the platform 38.

With the wheel blocks 98, 100 in place, the apparatus 10 is further stabilized to make it safer for loading, unloading, and working from the platform 38. For the performance of many construction tasks, the stabilized apparatus 10 offers a safer and steadier working platform than a conventional ladder. The apparatus 10 may be used to safely perform in this manner to perform certain tasks even without employing the wheel blocks 98, 100.

As noted, while the apparatus 10 may be manually moved and steered, the actuator/drive 22 and actuator/drive 24 may each be a powered mechanism that can be conveniently actuated without requiring input of a substantial force.

The apparatus 10 may have different dimensions depending upon where it will be used, how it will be used, the nature and weight of material it will support, etc. In one exemplary form, the apparatus 10 has: a) an overall length of 54"; b) a width of 32"; c) a lateral width W as in FIG. 3 of 49"; d) a platform height of 34"; and e) projection of the arm 22 on the order of 30".

Figure 14:
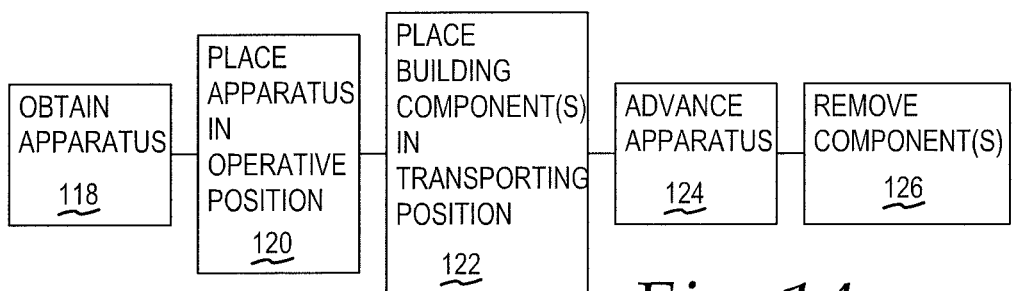
FIG. 14 is a flow diagram representation of a method of facilitating production of a structure at a construction site, according to the invention.

With the structure as described above, a method of facilitating production of a structure at a construction site can be carried out as shown in flow diagram form in FIG. 14.

As shown at block 118, a mobile apparatus, as described above, is obtained.

As shown at block 120, the mobile apparatus is placed in an operative position on a subjacent surface.

As shown at block 122, at least one building component is placed in a transporting position on the mobile apparatus.

As shown at block 124, with the at least one building component in the transporting position, the mobile apparatus is advanced between locations.

As shown at block 126, at the termination location, the at least one building component is separated from the transporting position used to assist construction, or to be integrated into a structure.

The foregoing disclosure of specific embodiments is intended to be illustrative of the broad concepts comprehended by the invention.

The invention claimed is:
1. A mobile apparatus having a front, a rear, a top, and laterally spaced sides and comprising:
   a frame;
   a plurality of wheels on the frame that support the mobile apparatus in an operative position on a subjacent surface,
   the plurality of wheels comprising laterally spaced first and second wheels and a third wheel spaced in a fore-and-aft direction from the first and second wheels and residing laterally between the first and second wheels,
   the first and second wheels each having a radius of at least 12" and a ground engaging width of at least 4",
   the third wheel selectively repositionable relative to the frame to allow controlled directional movement of the mobile apparatus as the first, second, and third wheel are rolled against a subjacent surface with the mobile apparatus in the operative position,
   the third wheel at least one of: a) overlapped with the first and second wheels in a fore-and-aft direction; and b) spaced from the first and second wheels in a fore-and-aft direction a distance less than a diameter of the first and second wheels; and
   a platform on the frame defining a first upwardly facing surface that is spaced at least 20" above the subjacent surface with the mobile apparatus in the operative position.

2. A method of facilitating production of a structure at a construction site, the method comprising the steps of:
   a) obtaining the mobile apparatus of claim 1;
   b) placing the mobile apparatus in the operative position on a subjacent surface;
   c) placing at least one building component in a transporting position on the first upwardly facing surface with the mobile apparatus at a first location;
   d) with the at least one building component in the transporting position, advancing the mobile apparatus from the first location to a second location at or adjacent the construction site by causing the first and second wheels to be rolled against the subjacent surface; and
   e) with the mobile apparatus at the second location, separating the at least one building component from the transporting position so that the at least one building component can be used, or integrated into the structure, at the construction site.

3. The method of facilitating production of a structure at a construction site according to claim 2 further comprising the step of steering the mobile apparatus by repositioning the third wheel relative to the frame as the mobile apparatus is advanced from the first location to the second location.

4. The method of facilitating production of a structure at a construction site according to claim 2 wherein the step of advancing the mobile apparatus comprises engaging an elongate arm on the mobile apparatus and exerting a force on the elongate arm to thereby cause the first and second wheels to roll against the subjacent surface.

5. The method of facilitating production of a structure at a construction site according to claim 2 wherein the step of advancing the mobile apparatus comprises grasping a graspable handle fixed to the frame and exerting a force on the graspable handle to thereby cause the first and second wheels to roll against the subjacent surface.

6. The method of facilitating production of a structure at a construction site according to claim 2 wherein the step of advancing the mobile apparatus comprises operating a drive to turn at least one of the plurality of wheels.

7. The method of facilitating production of a structure at a construction site according to claim 2 further comprising the step of placing first and second blocks operatively with respect to one of the plurality of wheels, the first and second operatively placed blocks limiting rolling of the one of the plurality of wheels in opposite direction thereby to control unwanted movement of the mobile apparatus.

8. The method of facilitating production of a structure at a construction site according to claim 7 further comprising the steps of operatively placing the first and second blocks before placing the at least one building component in the transporting position.

9. The method of facilitating production of a structure at a construction site according to claim 7 further comprising the steps of operatively placing the first and second blocks and maintaining the first and second blocks operatively placed at the construction site while the at least one building component is separated from the transporting component.

10. The method of facilitating production of a structure at a construction site according to claim 2 further comprising the step of standing on the first upwardly facing surfaces while producing at least a part of the structure at the construction site.

11. The method of facilitating production of a structure at a construction site according to claim 10 wherein the first upwardly facing surface has a length between the front and rear of the mobile apparatus, the step of placing the at least one building component in the transporting position comprises placing a plurality of building block components on the first upwardly facing surface only on a first area extending from a first fore-and-aft location towards one of the front and rear of the mobile apparatus so as to define a standing area for a user extending from the first fore-and-aft location towards the other of the front and rear, the third wheel closer to the other of the front and rear than the one of the front and rear.

12. The method of facilitating production of a structure at a construction site according to claim 2 wherein the at least one building component comprises a plurality of building block components and the step of integrating the at least one building component comprises serially placing the building block components to produce the structure.

13. The method of facilitating production of a structure at a construction site according to claim 12 wherein multiple of the plurality of building block components are serially placed while standing on the first upwardly facing surface.

14. The mobile apparatus according to claim 1 wherein the mobile apparatus is supported entirely by the first, second, and third wheels.

15. The mobile apparatus according to claim 1 wherein with the mobile apparatus in the operative position on a subjacent surface, the first upwardly facing surface is spaced at least 30" above the subjacent surface.

16. The mobile apparatus according to claim 1 wherein with the mobile in the operative position on a subjacent surface, the first upwardly facing surface is spaced at least 40" above the subjacent surface.

17. The mobile apparatus according to claim 1 wherein the third wheel is repositionable by turning relative to the frame around a vertically extending axis.

18. The mobile apparatus according to claim 1 wherein the first upwardly facing surface is substantially flat and resides in a plane that is substantially horizontal with the mobile apparatus in the operative position on a horizontal subjacent surface.

19. The mobile apparatus according to claim 1 wherein each of the first and second wheels has a pneumatic tire.

20. The mobile apparatus according to claim 1 wherein there is a blocking wall projecting upwardly from the first upwardly facing surface to confine objects placed on the first upwardly facing surface.

21. The mobile apparatus according to claim 1 further comprising an elongate arm that is movable guidingly relative to the frame to thereby reposition the third wheel.

22. The mobile apparatus according to claim 21 wherein the elongate arm projects one of: a) forwardly; and b) rearwardly from the frame.

23. The mobile apparatus according to claim 22 wherein the elongate arm has an elongate body that extends substantially horizontally and that is graspable by a user to allow repositioning of the third wheel and exert a force thereon to cause the first and second wheels to roll against a subjacent surface.

24. The mobile apparatus according to claim 23 wherein the mobile apparatus has a width, the mobile apparatus further comprising another graspable handle, spaced from the elongate arm, and fixed on the frame, the another graspable handle having a body with an elongate shape with a lateral length extending over a majority of the width of the mobile apparatus.

25. The mobile apparatus according to claim 1 further comprising a powered drive for turning at least one of the plurality of wheels.

26. The mobile apparatus according to claim 1 further comprising a shelf on the frame defining a second upwardly facing surface spaced vertically from the first upwardly facing surface.

27. The mobile apparatus according to claim 1 wherein the frame is made from attached angle iron pieces that cooperatively bound a cuboid shape with a fore-and-aft length dimension greater than a lateral width dimension.

28. The mobile apparatus according to claim 1 wherein the first and second wheels extend laterally beyond the first upwardly facing surface.

* * * * *